Oct. 4, 1960 J. E. LINDSAY 2,955,265

SIGNAL WAVE-FORM CONVERTER

Filed Dec. 21, 1956

*INVENTOR.*
JAMES E. LINDSAY

*BY*

G. W. O'Brien
W. E. Quesenbery ATTYS

United States Patent Office 2,955,265

Patented Oct. 4, 1960

2,955,265

SIGNAL WAVE-FORM CONVERTER

James E. Lindsay, Moorestown, N.J., assignor, by mesne assignments, to the United States of America as represented by the Secretary of the Navy Filed Dec. 21, 1956, Ser. No. 630,010

8 Claims. (Cl. 332—47)

This invention relates generally to signal translating circuits, and more particularly to circuits for developing a large amplitude impulse signal correlative to a slowly varying unidirectional intelligence signal.

Although circuitry for converting intelligence from a unidirectional intelligence signal into impulses has been heretofore devised and utilized, such for example as magnetic amplifier circuitry, they have not been found to be entirely satisfactory for many present day electrical applications by reason of their relatively low sensitivity, large power drain requirements, and excessive space requirements. An additional disadvantage of many present day translating circuits is their inability to withstand the severe shock and vibration requirements of present day equipment.

Accordingly, one object of the present invention is to provide a new and improved simple and compact signal translating circuit overcoming many of the disadvantages of heretofore devised signal translating circuits.

A basic object of the invention is to provide novel circuit arrangements to convert signal wave-forms.

Another object of the present invention is to provide a new and improved signal translating circuit utilizing semiconductor circuit devices.

Still another object of the present invention is to provide a new and improved electronic circuit for converting a unidirectional intelligence signal into a plurality of impulse signals.

A further object of the present invention is to provide a new and improved stable high gain impulse translating circuit.

Other objects and many of the attendant advantages of the invention will be readily appreciated as the same becomes better understood by reference to the following detailed description when considered in connection with the accompanying drawings wherein.

Figure 1:
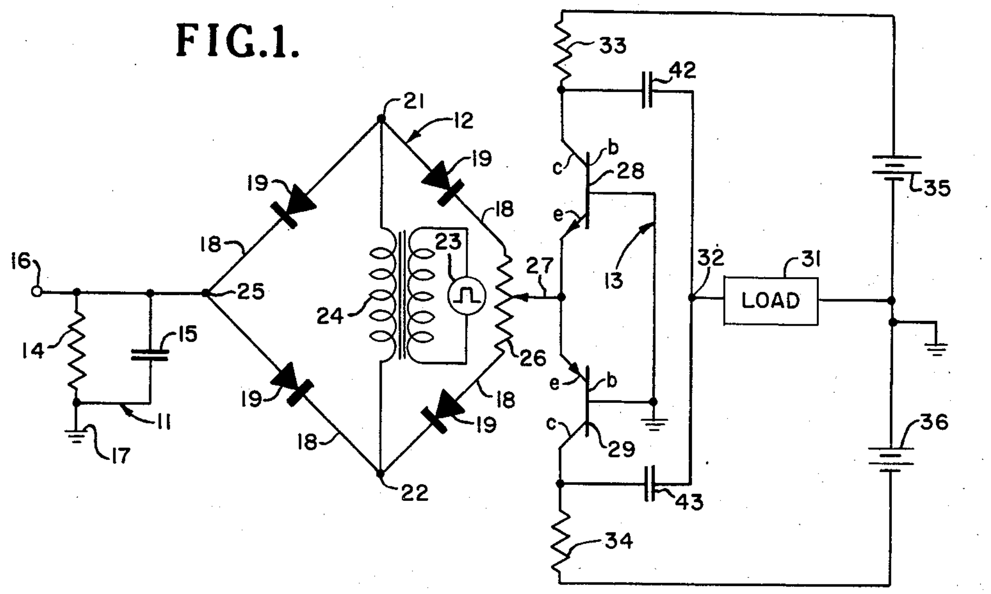
Fig. 1 is a schematic view of one arrangement of the present invention.

Referring now to the accompanying drawing wherein like reference characters indicate like parts throughout the several views, and more particularly to Fig. 1 whereon the signal translating circuit according to the present invention is shown to include an input network, a bridge modulator, and a complementary symmetry transistor amplifier, indicated generally by the reference numerals 11, 12, and 13 respectively. The input network 11 comprises a parallel connected resistor 14 and an energy storage device, or capacitor 15. The input signal, or intelligence, to be translated, comprises a small slowly varying direct current signal of either positive or negative polarity which is applied to the input network 11 across input terminal 16 and the common connection, or ground, 17. By way of example, and not limitation, an input signal of 0.1 microamperes has been applied to the input network 11. Application of the direct current intelligence signal to the network 11 charges the capacitor 15 to a particular potential, or energy level, which is proportional to the direct current intelligence signal, the charge on said capacitor constituting the input signal to be fed into the bridge modulator 12.

As shown, the bridge modulator 12 comprises a bridge arrangement formed of a pluraliety of interconnected arms 18, each arm having a rectifier element 19 contained therein; the element 19 being preferably of the semiconductor diode type, such for example as silicon diodes, for effecting a substantial impedance balance in the bridge. An impulse type driver, or control, signal is applied to diagonally opposite vertices or control terminals, 21 and 22 of the bridge modulator from an impulse signal source, such for example as a pulse generator 23, through coupling transformer 24, for chopping up the input signal applied at input terminal, or vertex, 25 of the bridge modulator. By way of example and not limitation, the applied driver signal may be pulses each of 250 microsecond duration and having a 3 cps. repetition rate. It is thus seen that ring modulator 12 allows the signal stored by capacitor 15 to be applied to amplifier 13 for a small portion of each cycle, i.e. pulse generator 23 causes the modulator to have a short duty cycle. A potentiometer 26 is inserted between two arms of the bridge modulator to compensate for any impedance unbalance existing between the diode elements 19 in the bridge. By means of the well known chopping and switching action of a bridge modulator, an output impulse signal is developed at output terminal 27 which is phased with the driver impulses and having an amplitude and polarity correlative to the instantaneous charge on capacitor 15, developed by the slowly varying direct current which output signal is directly coupled to a complementary symmetry transistor amplifier 13. The amplifier 13 includes a pair of junction transistors 28 and 29 of opposite conductivity types, each transistor having base, collector and emitter electrodes, designated respectively by the reference characters *b*, *c*, *e*. The transistors 28 and 29 may be of the n-p-n and p-n-p type shown, respectively. The emitter electrodes *e* of the transistors 28 and 29 are commonly direct coupled to the output terminal 27 of the bridge modulator, while the collector electrodes *c* are connected through capacitors 42 and 43 respectively in parallel across a load, or utilization, device 31 at load terminal 32. In addition, the collector electrodes *c* are connected through their respective collector load resistances 33 and 34 to unidirectional electrical energy sources, represented by batteries 35 and 36, for providing a suitable reverse bias for the collector circuits of transistors 28 and 29. Since the base electrode *b* is common to the emitter and collector circuits of junction transistors 28 and 29, the transistors are being operated under the well known common base amplifier configuration conditions. Inasmuch as the movable center contact of potentiometer 26 is utilized as the output terminal, or vertex, 27 of the bridge modulator, balanced impulse signals for the complementary symmetry amplifier 13 may be developed by adjustment of the potentiometer to compensate for any impedance unbalance existing in the bridge modulator 12. Additionally during the interval between the development of output impulse signals, the bridge modulator substantially isolates the transistor amplifier 13 from the source of the slowly varying direct current input signal by presenting an A.C. impedance in excess of 100 megohms. During the period of output impulse development, the A.C. impedance of the bridge modulator is in the vicinity of 100 ohms, depending upon the level of the output impulse current.

The complementary symmetry amplifier circuit 13 is being operated under common base conditions whereunder no phase reversal exists between the input signal, or impulse, applied to the emitter electrode *e* and the output signal, or impulse, appearing on the collector electrode *c*.

It will be apparent to one skilled in the art that the use of a complementary symmetry circuit arrangement results in a minimum of current and energy drain by reason of the emitters *e* of the transistors being held at substantially the same potential as the base electrodes *b* thereof. Moreover, the use of complementary symmetry permits the application of an amplified impulse to the load device 31 in response to either polarity of input impulse signal applied to the amplifier 13. For example, if an impulse signal of positive polarity exists at terminal 27, p-n-p transistor 29 conducts thereby developing a positive impulse signal across load 31. Conversely, an impulse signal of negative polarity at terminal 27 will render the n-p-n transistor 28 conductive whereby a negative impulse signal will be applied to load 31.

Figure 2:
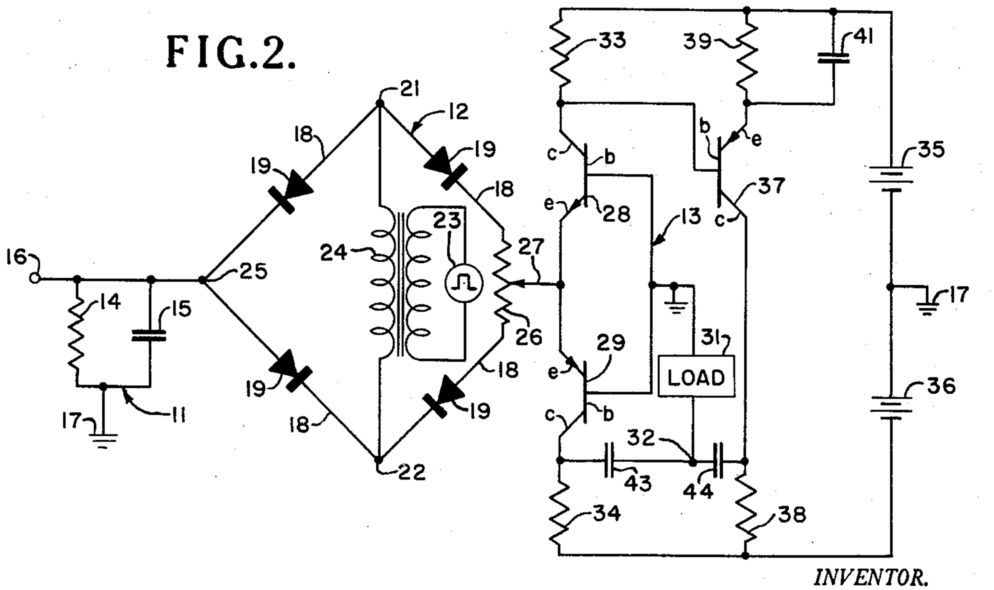
Fig. 2 is a schematic view of an alternative arrangement of the present invention.

As shown in Fig. 2, load applications requiring like polarity impulses, such for example as positive impulses, can be provided for by the insertion of a phase inverter stage between the load 31 and the amplifier 13. The phase inverter stage includes a p-n-p junction transistor 37 having emitter, collector and base electrodes. Collector resistor 38 and emitter resistor 39 with shunting capacitor 41 are associated with transistor 37 for providing the desired operating bias conditions therefor. Transistor 37 is operated under the common emitter conditions for obtaining signal polarity phase reversal between the impulse signal applied to the base electrode *b* and the amplified output signal appearing at the collector *c* thereof. In this manner, the impulses applied across the load 31 from transistors 29 and 37 through coupling capacitors 43 and 44, respectively, will be of the desired positive polarity.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A signal translating circuit comprising a direct current intelligence signal source, an impulse signal source, a bridge modulator connected to said sources for producing output impulse signals of either polarity correlative to the signals from said sources, the impulse signal being of such duration as to render said bridge modulator operative for a short duty cycle, and a complementary symmetry transistor amplifier for amplifying said output impulse signals of either polarity.

2. A signal translating circuit comprising electrical energy storage means, a source of a varying direct current intelligence signal for charging said means to a predetermined energy level, a source of impulse signals of a predetermined repetition rate, a bridge modulator connected to said storage means and to said impulse signal source for developing output impulses correlative to the instantaneous energy level on said storage means and to the repetition rate of said impulse signals, the impulse signals being of such duration as to render said bridge modulator operative for a short duty cycle, a complementary symmetry transistor amplifier circuit for amplifying the output impulses from said bridge modulator, and terminal means connected to said amplifier circuit for applying the amplified output impulses therefrom to a utilization device.

3. A signal translating circuit according to claim 2 wherein said complementary symmetry transistor amplifier circuit is direct coupled to said bridge modulator.

4. A signal translating circuit according to claim 2 wherein said bridge modulator includes a bridge arrangement of semiconductor rectifier elements, and a potentiometer inserted in said bridge arrangement for improving the impedance balance of said bridge arrangement and for coupling said bridge modulator to said complementary symmetry transistor amplifier.

5. A signal translating circuit according to claim 4 wherein the semiconductor rectifier elements of the bridge modulator are silicon diodes.

6. A signal translating circuit comprising a source of a slowly varying direct current intelligence signal, a source of impulse signals of a predetermined impulse repetition frequency, a bridge modulator connected to said sources for providing output impulses having a polarity correlative to the variation in said intelligence signal and a frequency correlative to the impulse repetition frequency of said impulse signals, the impulse signals being of such duration as to render said bridge modulator operative for a short duty cycle, a complementary symmetry transistor amplifier circuit connected to said bridge modulator for developing amplified output impulses having polarities corresponding to the polarity of the output impulses developed by said bridge modulator, and circuit means coupled to said amplifier circuit including a phase inverter responsive to said amplified output impulses of one polarity for providing like polarity impulses to a utilization device, said utilization device also being responsive to the amplified output impulses of the other polarity.

7. A signal translating circuit comprising a source of a slowly varying direct current intelligence signal, a source of impulse signals of a predetermined impulse repetition frequency, a bridge modulator connected to said sources for providing output impulses having a polarity correlative to the variation in said intelligence signal and a frequency correlative to the impulse repetition frequency of said impulse signals, the impulse signals being of such duration as to render said bridge modulator operative for a short duty cycle, a potentiometer inserted in said bridge modulator for compensating for bridge unbalance, a complementary symmetry transistor amplifier circuit connected to said bridge modulator for developing amplified output impulses having polarities corresponding to the polarity of the output impulses developed by said bridge modulator, and circuit means coupled to said amplifier circuit including a phase inverter responsive to said amplified output impulses of one polarity for providing like polarity impulses to a utilization device said utilization device also being responsive to the amplified output pulses of the other polarity.

8. A signal translating circuit according to claim 7 wherein said transistor amplifier is coupled to said bridge modulator by means of said potentiometer.

References Cited in the file of this patent

UNITED STATES PATENTS

| | | |
|---|---|---|
| 2,050,737 | Schriever | Aug. 11, 1937 |
| 2,086,601 | Caruthers | July 13, 1937 |
| 2,446,188 | Miller | Aug. 3, 1948 |
| 2,666,818 | Shockley | Jan. 19, 1954 |
| 2,782,267 | Beck | Feb. 19, 1957 |
| 2,791,645 | Bessey | May 7, 1957 |
| 2,817,757 | Durbin | Dec. 24, 1957 |

OTHER REFERENCES

Pub. I, "Transistor Modulator for Flight Trainer," Electronics, Sept. 1955, pages 126 and 127.

Pub. II, "Junction Transistor Circuit applications," Electronics, Aug. 1953, pp. 172.

Pub. III, "Balanced Crystal-Diode Modulator," Radio-Electronic Engineering, Sept. 1953, pp. 10, 11 and 27.